US012558952B2

(12) United States Patent
Foley et al.

(10) Patent No.: US 12,558,952 B2
(45) Date of Patent: Feb. 24, 2026

(54) VEHICLE COOLING USING EXTERNAL FLUID SOURCE

(71) Applicant: Howe & Howe Inc., Waterboro, ME (US)

(72) Inventors: Timothy Merlin Foley, Lyman, ME (US); Matthew Gregory Williams, Kennebunk, ME (US)

(73) Assignee: Howe & Howe Inc., Waterboro, ME (US)

( * ) Notice: Subject to any disclaimer, the term of this patent is extended or adjusted under 35 U.S.C. 154(b) by 180 days.

(21) Appl. No.: 18/462,788

(22) Filed: Sep. 7, 2023

(65) Prior Publication Data

US 2024/0083214 A1 Mar. 14, 2024

Related U.S. Application Data

(60) Provisional application No. 63/405,292, filed on Sep. 9, 2022.

(51) Int. Cl.
| | |
|---|---|
| B60K 11/02 | (2006.01) |
| A62C 27/00 | (2006.01) |
| B60K 1/00 | (2006.01) |
| B60L 58/26 | (2019.01) |

(52) U.S. Cl.
CPC .............. B60K 11/02 (2013.01); A62C 27/00 (2013.01); B60L 58/26 (2019.02); B60K 2001/003 (2013.01); B60K 2001/006 (2013.01); B60L 2200/40 (2013.01)

(58) Field of Classification Search
CPC ..... A62C 27/00; B60K 11/02; F01P 2003/006
See application file for complete search history.

(56) References Cited

U.S. PATENT DOCUMENTS

| | | | | | |
|---|---|---|---|---|---|
| 1,013,622 | A | * | 1/1912 | Schoonmaker | ........ A62C 27/00 169/24 |
| 3,155,319 | A | * | 11/1964 | Hammelmann | ......... A62C 3/02 239/722 |
| 4,817,653 | A | * | 4/1989 | Krajicek | ............... B08B 9/0933 239/722 |
| 5,509,381 | A | * | 4/1996 | Fisher | .................... F01M 9/108 123/41.31 |
| 6,029,750 | A | * | 2/2000 | Carrier | .................... A62C 27/00 296/19 |

(Continued)

FOREIGN PATENT DOCUMENTS

| | | |
|---|---|---|
| CN | 108031041 | 5/2018 |
| CN | 108815754 | 11/2018 |

(Continued)

OTHER PUBLICATIONS

International Search Report and Written Opinion for PCT application No. PCT/US2023/032163, dated Jan. 4, 2024, 12 pages.

*Primary Examiner* — Christopher R Zerphey
(74) *Attorney, Agent, or Firm* — BainwoodHuang

(57) ABSTRACT

A technique for providing cooling in a firefighting vehicle leverages the availability of firefighting fluid for cooling the vehicle's components. By tapping into a conduit or manifold that receives firefighting fluid to be sprayed toward a fire, an amount of cooling fluid is drawn and directed through one or more liquid-to-liquid heat exchangers, for providing cooling of the vehicle's components.

19 Claims, 6 Drawing Sheets

(56) References Cited

U.S. PATENT DOCUMENTS

| | | | | |
|---|---|---|---|---|
| 7,082,775 B1 * | 8/2006 | Edwards | ................ | A62B 99/00 |
| | | | | 62/171 |
| 7,201,213 B2 | 4/2007 | Leeson et al. | | |
| 7,264,062 B1 * | 9/2007 | Ham | ...................... | B62D 29/00 |
| | | | | 239/722 |
| 7,856,810 B2 | 12/2010 | Longdill et al. | | |
| 7,963,271 B2 | 6/2011 | Samanta et al. | | |
| 8,381,826 B2 * | 2/2013 | Al-Azemi | .............. | A62C 27/00 |
| | | | | 169/70 |
| 8,973,671 B2 * | 3/2015 | Alsaif | ................... | A62C 27/00 |
| | | | | 180/9.1 |
| 9,623,271 B2 * | 4/2017 | McLoughlin | .......... | A62C 33/04 |
| 10,246,174 B2 * | 4/2019 | Stimmel | ............. | B63H 21/383 |
| 10,378,425 B2 | 8/2019 | Quix et al. | | |
| 10,835,769 B2 * | 11/2020 | Neal | ..................... | A62C 3/0292 |
| 11,034,427 B2 | 6/2021 | Stimmel et al. | | |
| 11,345,267 B2 * | 5/2022 | Howe | .................. | F02M 35/104 |
| 12,083,367 B2 * | 9/2024 | Tang | ...................... | A62C 31/02 |
| 2007/0119157 A1 | 5/2007 | Longdill et al. | | |
| 2009/0014186 A1 * | 1/2009 | Collins | .................. | A62C 27/00 |
| | | | | 169/30 |
| 2011/0232925 A1 * | 9/2011 | Al-Azemi | .............. | A62C 27/00 |
| | | | | 169/52 |
| 2013/0112440 A1 * | 5/2013 | Alsaif | ................... | A62C 27/00 |
| | | | | 901/41 |
| 2017/0112021 A1 | 4/2017 | Gradinger et al. | | |
| 2021/0237537 A1 | 8/2021 | Hwang et al. | | |

FOREIGN PATENT DOCUMENTS

| | | |
|---|---|---|
| CN | 114470580 | 5/2022 |
| EP | 2310789 | 2/2012 |

* cited by examiner

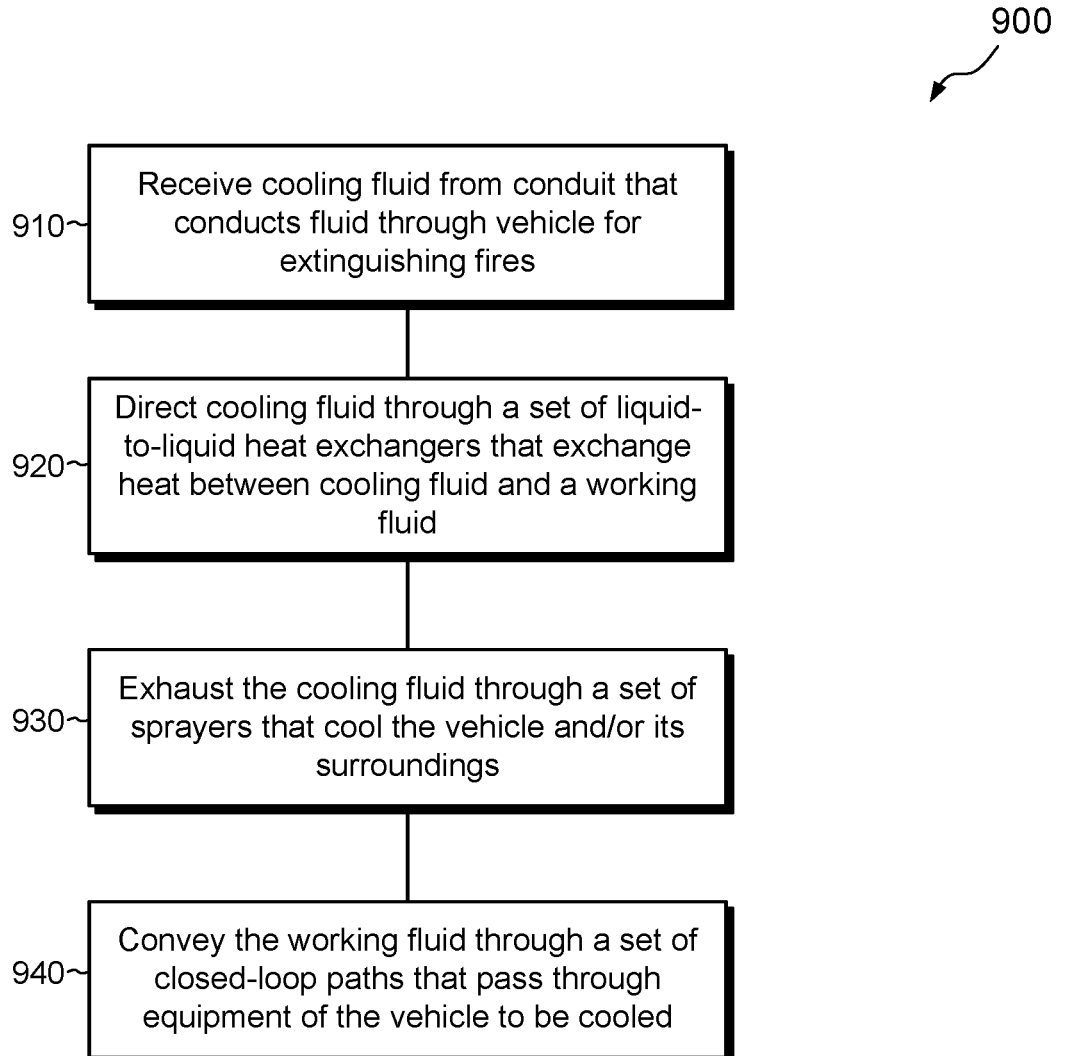

900

910 — Receive cooling fluid from conduit that conducts fluid through vehicle for extinguishing fires 920 — Direct cooling fluid through a set of liquid-to-liquid heat exchangers that exchange heat between cooling fluid and a working fluid 930 — Exhaust the cooling fluid through a set of sprayers that cool the vehicle and/or its surroundings 940 — Convey the working fluid through a set of closed-loop paths that pass through equipment of the vehicle to be cooled

*FIG. 9*

VEHICLE COOLING USING EXTERNAL FLUID SOURCE

BACKGROUND

1. Field

This disclosure relates generally to vehicle designs, and more particularly to a cooling system and method for a firefighting vehicle.

2. Description of Related Art

Firefighting vehicles include firetrucks and firefighting robots. Firefighting robots are specially adapted for spraying water on fires. Smaller than firetrucks, firefighting robots are maneuverable, remote-controlled vehicles that are able to aim water accurately at desired targets. For example, the Thermite robot available from Howe & Howe, Inc. of Waterboro, ME, is a remote controlled, tracked vehicle with a remotely aimed nozzle (monitor) that can discharge 1,500 gallons or more of water per minute. The Thermite has the ability to withstand environments that are too hazardous for human personnel.

SUMMARY

Providing cooling for a firefighting vehicle can present particular challenges. For example, the drivetrain and other components of the firefighting vehicle can generate substantial heat during operation. In an electrically-powered vehicle, for example, motors, batteries, power supplies, and other components generate heat and must be kept within safe operating temperatures. Unfortunately, the ambient environment around the vehicle can be exceedingly hot and thus is poorly suited for cooling the vehicle's components. What is needed, therefore, is a cooling solution for a firefighting vehicle that operates in hot environments.

The above need is addressed at least in part by an improved technique that leverages the availability of firefighting fluid for cooling a vehicle's components. By tapping into a conduit or manifold that receives firefighting fluid to be sprayed toward a fire, an amount of cooling fluid is drawn and directed through one or more liquid-to-liquid heat exchangers, for providing cooling of the vehicle's components.

Advantageously, the components of the firefighting vehicle can be kept at safe operating temperatures even in exceedingly hot environments.

Certain embodiments are directed to a method of providing cooling for a firefighting vehicle. The method includes directing cooling fluid through a liquid-to-liquid heat exchanger that exchanges heat between the cooling fluid and a working fluid, the cooling fluid drawn from a supply of fluid received by the vehicle for extinguishing fires. The method further includes exhausting the cooling fluid through a set of sprayers that cool external portions of the vehicle and/or surroundings of the vehicle, and conveying the working fluid within a closed-loop path that cools a plurality of equipment within the vehicle.

In some examples, conveying the working fluid through the closed-loop path includes pumping the working fluid around the closed loop path.

In some examples, the method further includes arranging the plurality of equipment such that equipment requiring a greater amount of cooling is placed around the closed-loop path closer to an outlet of working fluid from the liquid-to-liquid heat exchanger than equipment requiring a lesser amount of cooling.

In some examples, the method further includes: directing additional cooling fluid drawn from the supply of fluid through a second liquid-to-liquid heat exchanger that exchanges heat between the additional cooling fluid and additional working fluid; exhausting the additional cooling fluid through one of (i) the set of sprayers or (ii) a second set of sprayers that cool external portions of the vehicle and/or surroundings of the vehicle; and conveying the additional working fluid through a second closed-loop path that provides cooling for a second plurality of equipment within the vehicle.

In some examples, the plurality of equipment includes components for propelling a first track on a first side of the vehicle, and the second plurality of equipment includes components for propelling a second track on a second side of the vehicle.

In some examples, the vehicle operates in a first cooling mode when the cooling fluid is being directed through the liquid-to-liquid heat exchanger, and the method further includes operating the vehicle in a second cooling mode when the cooling fluid is not being directed through the liquid-to-liquid heat exchanger. Operating the vehicle in the second cooling mode includes pumping the working fluid around a third closed-loop path that at least partially overlaps with the closed-loop path and includes a radiator that exchanges heat between the working fluid and ambient air around the vehicle.

In some examples, operating the vehicle in the second cooling mode is responsive to detecting that the cooling fluid is no longer being directed through the liquid-to-liquid heat exchanger.

In some examples, the vehicle is powered at least in part using batteries, and the method further includes operating the vehicle in the second cooling mode when charging the batteries.

In some examples, the radiator has a fan, and the method further includes running the fan when the vehicle is operating in the second cooling mode, and disabling the fan when to the vehicle is operating in the first cooling mode.

Other embodiments are directed to a cooling system for a firefighting vehicle. The cooling system includes a liquid-to-liquid heat exchanger constructed and arranged to exchange heat between a cooling fluid and a working fluid, the cooling fluid drawn from a supply of fluid received by the firefighting vehicle for extinguishing fires. The cooling system further includes a set of sprayers coupled to the liquid-to-liquid heat exchanger for spraying the cooling fluid onto external portions of the vehicle and/or surroundings of the vehicle after the cooling fluid has passed through the liquid-to-liquid heat exchanger. The cooling system still further includes a closed-loop path within which the working fluid is circulated, the closed-loop path including the liquid-to-liquid heat exchanger and a plurality of equipment to be cooled within the vehicle.

In some examples, the cooling system further includes a pump constructed and arranged to circulate the working fluid within the closed-loop path.

In some examples, the plurality of equipment is arranged such that equipment requiring a greater amount of cooling is placed around the closed-loop path closer to an outlet of working fluid from the liquid-to-liquid heat exchanger than equipment requiring a lesser amount of cooling.

In some examples, the cooling system further includes: a second liquid-to-liquid heat exchanger constructed and arranged to exchange heat between additional cooling fluid and additional working fluid, the additional cooling fluid drawn from the supply of fluid received by the vehicle for extinguishing fires; a second set of sprayers coupled to the second liquid-to-liquid heat exchanger for spraying the additional cooling fluid onto external portions of the vehicle and/or surroundings of the vehicle after the additional cooling fluid has passed through the second liquid-to-liquid heat exchanger; and a second closed-loop path within which the additional working fluid is circulated, the second closed-loop path including the second liquid-to-liquid heat exchanger and a second plurality of equipment to be cooled within the vehicle.

In some examples, the closed-loop path at least partially overlaps with the second closed loop path.

In some examples, the plurality of equipment includes components for propelling a first track on a first side of the vehicle, and the second plurality of equipment includes components for propelling a second track on a second side of the vehicle.

In some examples, the cooling system further includes an auxiliary pump constructed and arranged to circulate the working fluid within a third closed-loop path that includes a first subset of the plurality of equipment but excludes a second subset of the plurality of equipment.

In some examples, the third closed-loop path includes a radiator constructed and arranged to exchange heat between the working fluid and ambient air around the vehicle.

In some examples, the cooling system further includes a fan constructed and arranged to blow air through the radiator, wherein the fan is configured to run when the auxiliary pump is running and not to run when the auxiliary pump is not running.

In some examples, the vehicle is powered at least in part using batteries, and the auxiliary pump and the fan are configured to run when charging the batteries.

Still other embodiments are directed to a cooling system for a firefighting vehicle. The cooling system includes a liquid-to-liquid heat exchanger constructed and arranged to exchange heat between a cooling fluid and a working fluid, the cooling fluid drawn from a supply of fluid received by the firefighting vehicle for extinguishing fires. The cooling system further includes a set of openings coupled to the liquid-to-liquid heat exchanger for exhausting the cooling fluid outside the vehicle after the cooling fluid has passed through the liquid-to-liquid heat exchanger. The cooling system still further includes a closed-loop path within which the working fluid is circulated, the closed-loop path including the liquid-to-liquid heat exchanger and a plurality of equipment to be cooled within the vehicle.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 9 is a flowchart that shows an example cooling method in accordance with certain embodiments.

DETAILED DESCRIPTION

Figure 1:
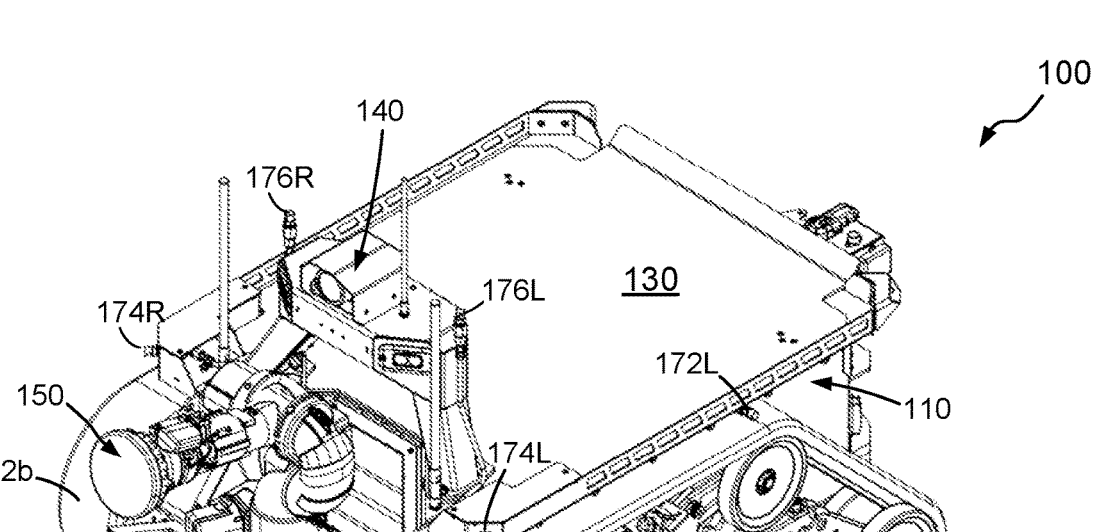
FIG. 1 is an upper-left isometric view of an example firefighting vehicle with which embodiments of the improved technique can be practiced.

Embodiments of the improved technique will now be described. One should appreciate that such embodiments are provided by way of example to illustrate certain features and principles but are not intended to be limiting.

An improved technique for providing cooling in a firefighting vehicle leverages the availability of firefighting fluid for cooling the vehicle's components. By tapping into a conduit or manifold that receives firefighting fluid to be sprayed toward a fire, an amount of cooling fluid is drawn and directed through one or more liquid-to-liquid heat exchangers, for providing cooling of the vehicle's components. Advantageously, the components of the firefighting vehicle can be kept at safe operating temperatures even in exceedingly hot environments.

FIGS. 1-5 show an example firefighting vehicle 100 in which embodiments of the improved technique can be practiced. As shown, the firefighting vehicle 100 has a chassis 110 which houses components to be cooled. Assuming the vehicle is electrically powered, examples of such components include battery packs, motors, motor controllers, and DC/DC converters. Other components may be provided in the chassis 110 if the vehicle 100 is gasoline or diesel powered. In an example, the vehicle 100 has left and right tracks 122a and 122b, respectively, which are driven by respective drive sprockets 124 (e.g., one drive sprocket 124 per track). In an electrically-powered arrangement, electric motors within the chassis 110 rotate the drive sprockets 124 to move the vehicle 100 forward or in reverse. Skid steering can be achieved by driving one sprocket forward and the other in reverse or by driving the sprockets at different speeds.

As further shown, the vehicle 100 includes an adapter 210 (FIG. 2), such as a half-coupling, for attaching to a hose or other line (not shown) for receiving firefighting fluid, such as water, foam, or a combination thereof, from a firetruck or fire hydrant. The vehicle 100 includes a conduit, or multiple conduits, for conveying the firefighting fluid from the adapter 210, along a floor 110F of the chassis 110, and to a monitor 150 located at a front of the vehicle. In an example, the monitor 150 may be aimed in both altitude and azimuth to direct the firefighting fluid accurately toward a fire.

In the example shown, the firefighting vehicle 100 is a remote-controlled, firefighting robot equipped with controls and cameras for maneuvering through hot, smokey environments without subjecting personnel to physical risks. Such personnel may operate the vehicle using a belly pack or other remote controller. The improvements described herein may be used with other types of firefighting vehicles, however, including those which are not robots and are not remote controlled.

Figure 2:
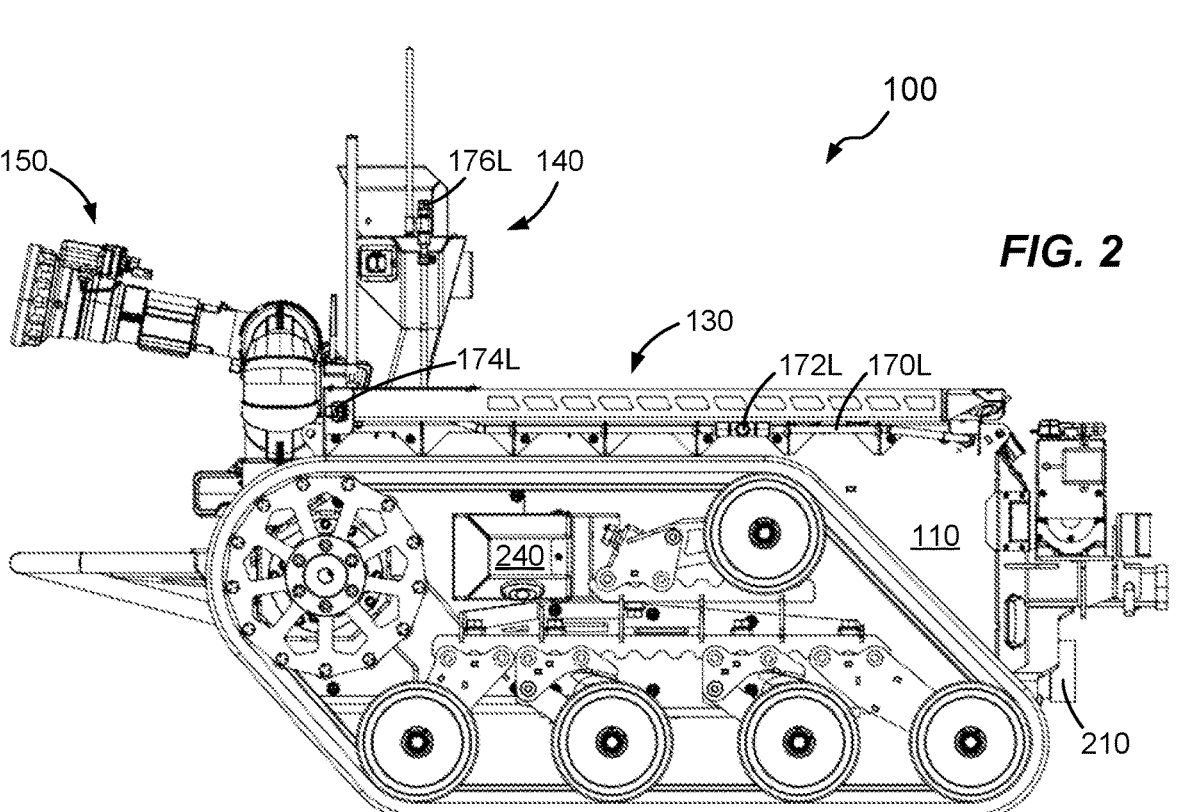
FIG. 2 is a left elevated view thereof.

In some examples, the vehicle 100 includes multiple sprayers, such as left-side sprayers 172L, 174L, and 176L and right-side sprayers 172R, 174R, and 176R. The sprayers connect to a source (or multiple sources) of firefighting fluid via left and right fluid lines 170L and 170R (FIG. 2).

In some examples, a radiator 240 (FIG. 2) may be provided on one or both sides of the vehicle 100 for cooling components within the chassis 110 using ambient air. The radiator(s) may be placed in other locations, however, such as at the rear of the vehicle 100. In an example, the radiator(s) 240 are active only when the vehicle 100 is not receiving firefighting fluid, e.g., when the environment around the vehicle 100 is not excessively hot.

Figures 3, 4:
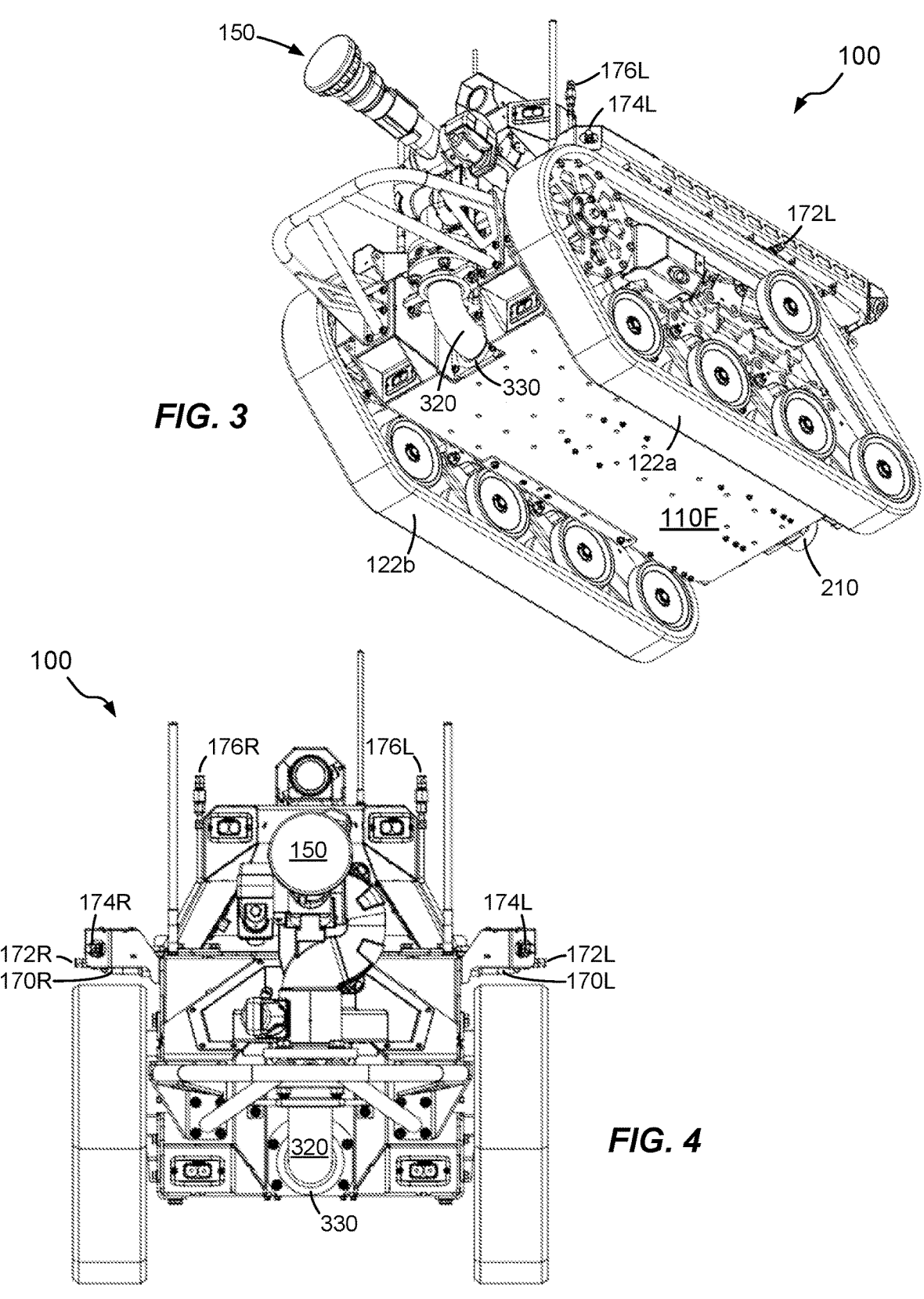
FIG. 3 is a lower-left isometric view thereof.
FIG. 4 is a front elevated view thereof.

As shown in FIGS. 3 and 4, the vehicle 100 may include front piping 320 for conveying firefighting fluid from the internal conduit to the monitor 150. A flexible insert 330 may be provided to provide suspension and cushioning between the conduit and the chassis 110. A separate flexible insert 330 may be provided at the rear of the vehicle (FIG. 5), or the same insert 330 may extend through the vehicle 100 from front to back.

Figures 5, 6:
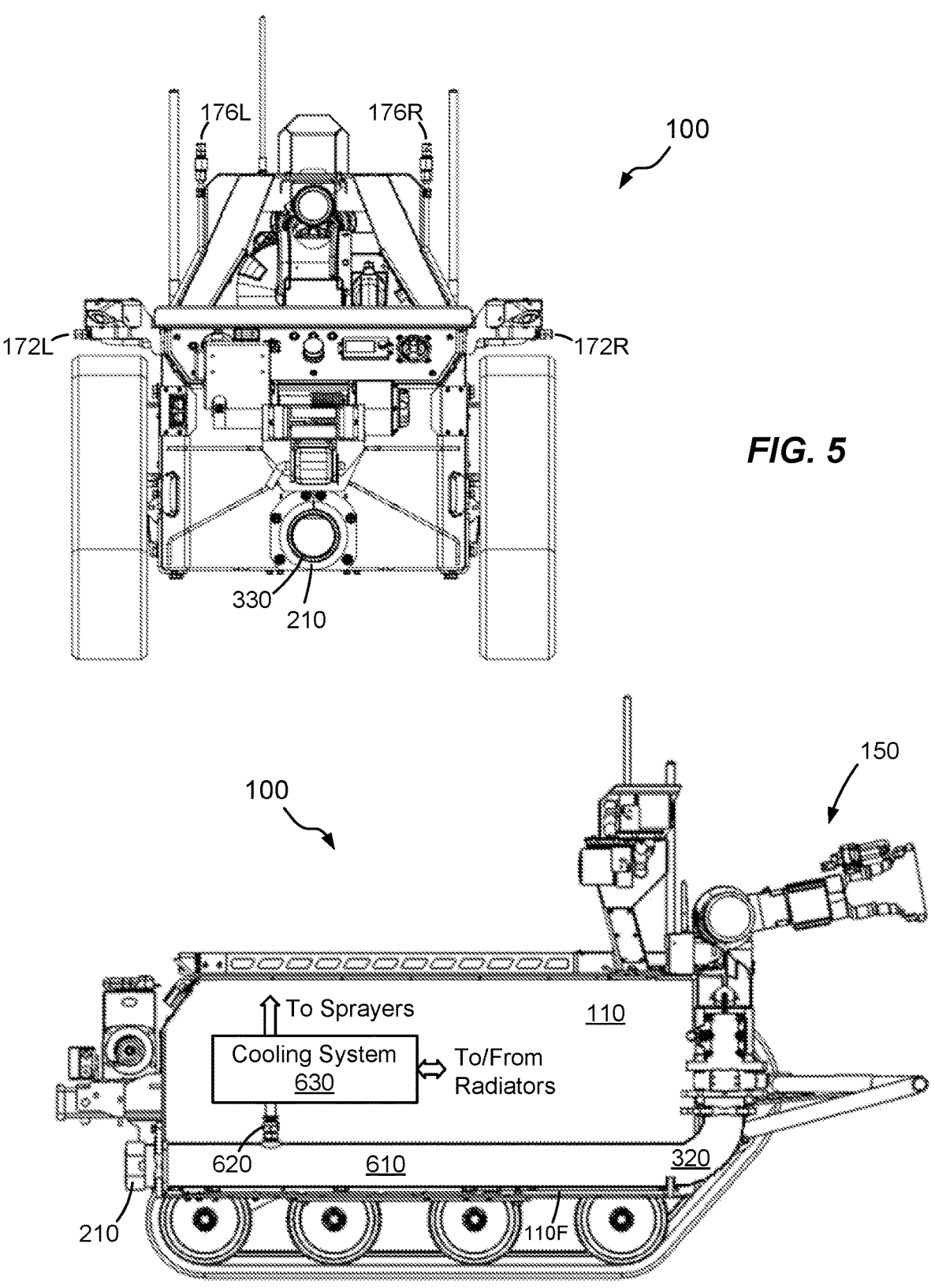
FIG. 5 is a rear elevated view thereof.
FIG. 6 is an elevated right, partially sectional view of the example firefighting vehicle, in which certain components are shown schematically.

FIG. 6 shows a partial sectional view of the vehicle 100. Here, the conduit is shown with reference 610 to extend directly from the adapter 210 to the front piping 320. In an example, the conduit 610 is provided as a single pipe that runs along the middle of the floor 110F of the chassis 110. Other arrangements are possible, however.

As further shown, a fluid tap 620 attaches to the conduit 610, where it is configured to draw a portion of the firefighting fluid from the conduit 610 and to a cooling system 630. The cooling system 630 uses the tapped-off fluid for cooling components within the chassis 110 when the vehicle 100 is engaged in firefighting. For example, one or more liquid-to-liquid heat exchangers of the cooling system 630 may exchange heat between the tapped-off fluid and a working fluid, such as a glycol-based antifreeze or some other type of antifreeze. The working fluid may travel around one or more closed-loop paths that encompass equipment to be cooled. In some examples, spent cooling fluid from the cooling system 630 is conveyed to the sprayers described above, e.g., for cooling external surfaces of the vehicle 100 and/or the vehicle's surroundings. In some examples, the cooling system 630 conveys the working fluid to radiators 240, e.g., for cooling equipment within the chassis 110 when the vehicle is not engaged in firefighting, i.e., when the environment around the vehicle 100 is not excessively hot.

Figure 7:
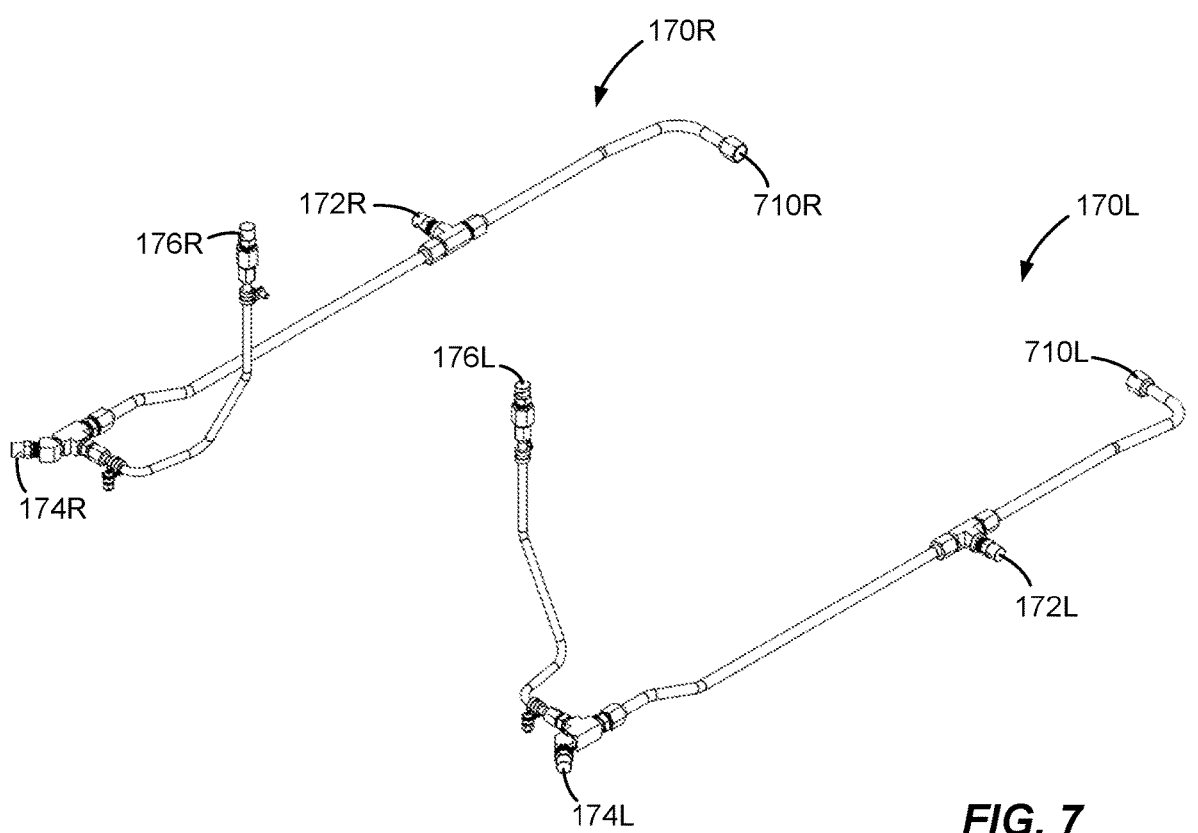
FIG. 7 is an upper-left, isometric view of sprayers and associated components for cooling external surfaces and/or surroundings of the firefighting vehicle of FIG. 1.

FIG. 7 shows the above-described sprayers and associated piping in additional detail. In an example, half-couplings 710L and 710R attach to respective liquid-to-liquid heat exchangers for receiving spent tapped-off firefighting fluid. For example, spent fluid flows into the lines 170L and 170R from respective liquid-to-liquid heat exchangers and exits the vehicle from the left-side sprayers 172L, 174L, and 176L and the right-side sprayers 172R, 174R, and 176R. The tapped-off firefighting fluid thus serves the dual purpose of both supplying cooling for internal components and providing cooling/fire suppressant for external surfaces of the vehicle, including tracks 122a and 122b, as well as surroundings of the vehicle.

Figure 8:
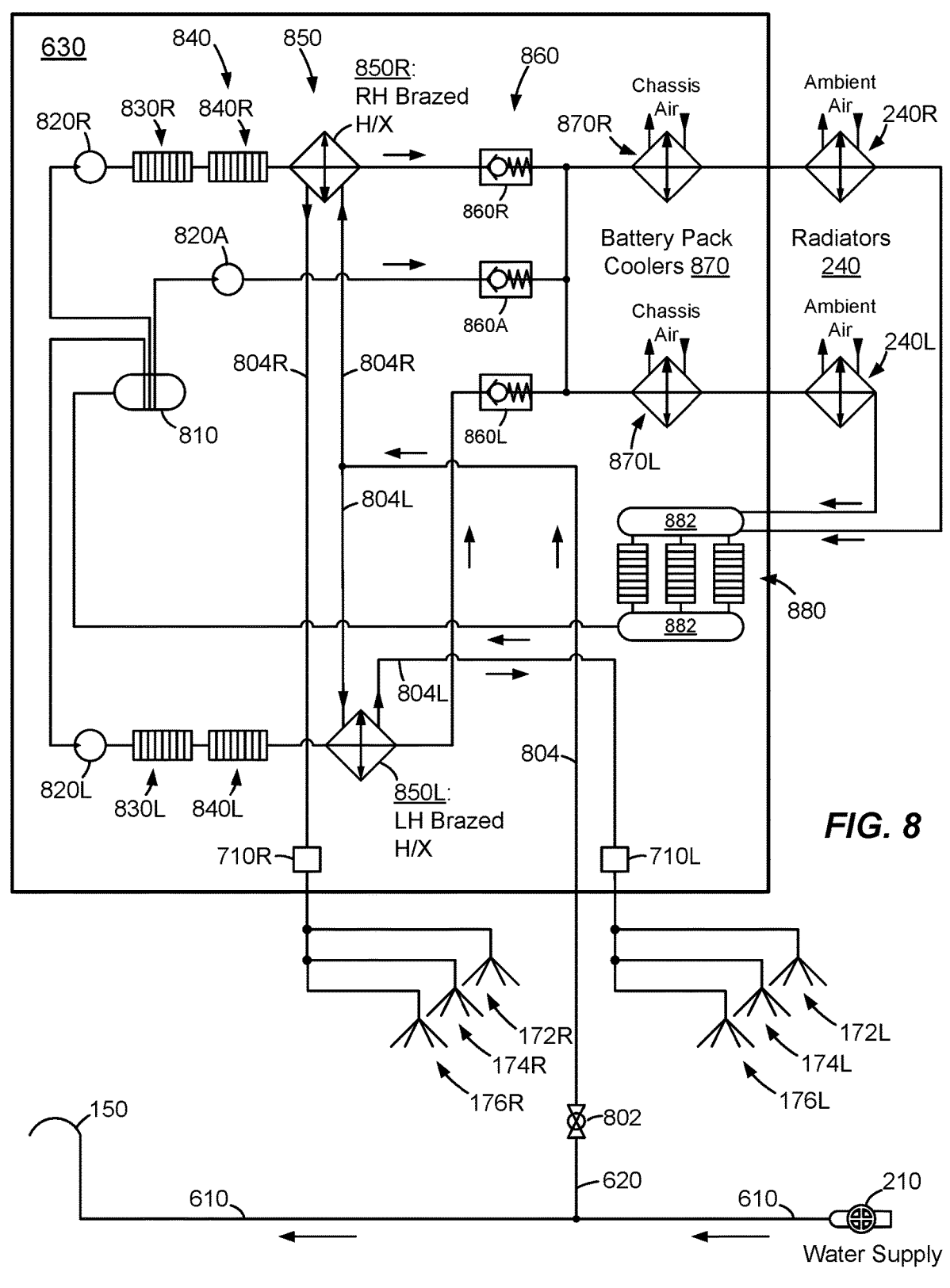
FIG. 8 is a schematic diagram of an example cooling system in accordance with certain embodiments.

FIG. 8 shows the example cooling system 630 in additional detail. Here, cooling fluid (i.e., firefighting fluid) enters the system 630 from the conduit/pipe 610 via the half coupling 210. Cooling fluid flows through the conduit/pipe 610 toward the monitor 150, where it may be emitted in a desired direction, such as toward a fire. Along the pipe 610 between the half coupling 210 and the monitor 150, fluid tap 620 connects to the pipe 610 and draws away a small portion 804 of cooling fluid from the pipe 610, for the purpose of cooling the vehicle 100 and its equipment. In some examples, a valve 802 is provided in line with the fluid tap 620 for controllably enabling and disabling the passage of cooling fluid.

The drawn-off cooling fluid 804 splits down two paths, a first path 804L through a left liquid-to-liquid heat exchanger (H/X) 850L and a second path 804R through a right liquid-to-liquid heat exchanger 850R. Each heat exchanger 850L or 850R is constructed and arranged to exchange heat between the cooling fluid conducted along the respective path 804L or 804R and working fluid (antifreeze), which flows through the respective heat exchangers from left to right in the perspective of the figure. Although the heat exchangers exchange heat between the cooling fluid and the working fluid, the two different fluids are not mixed. For example, all of the cooling fluid that enters the liquid-to-liquid heat exchanger 850R at the bottom-right exits the heat exchanger 850R at the bottom-left. The path 804R is thus continuous through the heat exchanger 850R, and no cooling fluid is lost or gained. The same applies to the working fluid, e.g., all working fluid that enters at the left exits at the right. The arrangement for heat exchanger 850L is analogous.

Once the cooling fluid flows out of the heat exchangers 850L and 850R, the cooling fluid flows to one or more spray nozzles. For example, spent cooling fluid from heat exchanger 850L flows to sprayers 172L, 174L, and 176L, while spent cooling fluid from heat exchanger 850R flows to sprayers 172R, 174R, and 176R. In this manner, cooling fluid enters the cooling system via fluid tap 620, passes through liquid-to-liquid heat exchanger 850L and 850R, and then exits the cooling system via sprayers, which cool the external surfaces of the vehicle 100 and, in some examples, the environment around the vehicle. We refer to this cooling path as "open loop."

Meanwhile, the working fluid (e.g., antifreeze) is conducted through the cooling system in a closed-loop manner. For example, a first closed-loop path is formed primarily for left-side equipment and a second closed-loop path is formed primarily for right-side equipment. The first closed-loop path may start at a coolant reservoir 810 and proceed to a left coolant pump 820L, a left motor-controller coolant plate 830L, a left-side motor 840L, the liquid-to-liquid heat exchanger 850L, a check valve 860L, battery-pack coolers 870 (e.g., 870L and 870R), radiators 240 (e.g., 240L and 240R), cold plates 880 for DC/DC converters (via distribution manifolds 882), and back to the coolant reservoir 810. The second closed-loop path may start at a coolant reservoir 810 and proceed to a right coolant pump 820R, a right motor-controller coolant plate 830R, a right-side motor 840R, the liquid-to-liquid heat exchanger 850R, a check valve 860R, battery-pack coolers 870 (e.g., 870L and 870R), radiators 240 (e.g., 240L and 240R), cold plates 880 for DC/DC converters (via distribution manifolds 882), and back to the coolant reservoir 810.

In the example shown, the first and second closed-loop paths overlap in some areas, such as the coolant reservoir 810, battery-pack coolers 870, radiators 240, and DC/DC converter cold plates 880. However, the first and second closed-loop paths are distinct in other areas, such as the pumps 820L and 820R, motor controller cold plates 830L and 830R, motors 840L and 840R, liquid-to-liquid heat exchangers 850L and 850R, and check valves 860L and 860R. One should appreciate that the overlapping components in the first and second closed-loop paths merely reflects a design optimization. Alternatively, the first and second closed-loop paths can be entirely distinct.

Still further shown in FIG. 8 is a third, auxiliary closed-loop path, which may be active during battery charging or at other times when the vehicle 100 is not operating in an excessively hot environment and is not receiving firefighting fluid. The third closed-loop path starts at the coolant reservoir 810 and proceeds to an auxiliary pump 820A, on to a check valve 860A, the battery-pack coolers 870, the radiators 240, the DC/DC converter cold plates 880, and back to the coolant reservoir 810. The third closed-loop path thus partially overlaps with the first closed-loop path and the second closed-loop path. Missing from the third closed-loop path are the motor controller cold plates 830L and 830R, the motors 840L and 840R, and the liquid-to-liquid heat exchangers 850L and 850R. The third, auxiliary closed-loop path thus reflects usage of the vehicle 100 when charging the batteries or when operating in a low-power state in which cooling requirements are modest. It also ensures that the battery pack coolers 870 and DC/DC converter cold plates 880 are supplied with working fluid during battery charging.

In some examples, the cooling system 630 is operable in at least two different cooling modes, a first cooling mode in which tapped-off firefighting fluid flows through the liquid-to-liquid heat exchangers 850 and a second cooling mode in which tapped-off firefighting fluid does not flow through the liquid-to-liquid heat exchangers 850. In some examples, the cooling system 630 may include a sensor for detecting whether firefighting fluid is flowing through the liquid-to-liquid heat exchangers 850. When the sensor detects that fluid is flowing, the cooling system 630 responds by assuming the first cooling mode. When the sensor detects that fluid is not flowing, the cooling system 630 responds by assuming the second cooling mode. In other examples, temperature sensors are provided for measuring the temperature of the working fluid and the ambient temperature of the environment around the vehicle 100. In such examples, the cooling system 630 may assume the first cooling mode when the ambient temperature exceeds the temperature of the working fluid and may assume the second cooling mode when the ambient temperature is below the temperature of the working fluid. In still further examples, the cooling system 630 bases its selection of cooling mode on both fluid flow through the liquid-to-liquid heat exchangers 850 and the temperature difference between working fluid and ambient air In the first cooling mode (when fluid is flowing), pumps 820L and 820R are turned on (pumping) and fans associated with radiators 240 are turned off (not blowing). Auxiliary pump 820A may be turned off, but this is not required. The first cooling mode thus reflects a condition of active firefighting, when the vehicle is shooting firefighting fluid and has the fluid available for cooling components inside the vehicle.

In the second cooling mode (when fluid is not flowing), pumps 820L and 820R are turned off (not pumping) and fans associated with radiators 240 are turned on (blowing). Also, the auxiliary pump 820A is turned on (or left on). The second cooling mode thus reflects a non-active condition, when the vehicle is not shooting firefighting fluid and no firefighting fluid is available for cooling components inside the vehicle. Instead, the cooling system 630 relies upon radiators 240 for transferring heat from equipment to the ambient environment, which presumably is not excessively hot.

Continuing with reference to FIG. 8, working fluid is at its coldest when it exits to the right of the respective liquid-to-liquid heat exchangers 850. From there, the working fluid passes through check valves 860 (which allow conduction from left to right only) and then to battery-pack coolers 870. In an example, the battery coolers 870 exchange heat between the working fluid and chassis air, i.e., air internal to the chassis 110. The working fluid then passes through left and right radiators 240, which may operate in connection with respective fans to exchange heat with ambient air around the vehicle 110.

FIG. 9 shows an example method 900 of cooling a firefighting vehicle 100. The method 900 may be performed, for example, by the cooling system 630 operating within the vehicle 100. At 910, the cooling system 630 receives cooling fluid (i.e., tapped-off firefighting fluid) from the conduit 610, e.g., via fluid tap 620. At 920, cooling fluid is directed through a set of liquid-to-liquid heat exchangers 850 that exchange heat between the cooling fluid and a working fluid, such as antifreeze. At 930, the cooling fluid is exhausted through a set of sprayers (e.g., left-side sprayers 172L, 174L, and 176L and right-side sprayers 172R, 174R, and 176R), which cool external surfaces of the vehicle 100, which may include tracks 122a and 122b, and/or surroundings of the vehicle. At 940, the working fluid is conveyed through a set of closed-loop paths that pass through equipment of the vehicle to be cooled.

ADDITIONAL INFORMATION

In some examples, said one or more liquid-to-liquid heat exchangers are configured to exchange heat between the cooling fluid (e.g., water, gel, foam, or a combination thereof) and a working fluid, such as a glycol-based antifreeze or some other type of antifreeze.

In some examples, the cooling fluid enters the cooling system from a conduit 610, passes through the liquid-to-liquid heat exchanger(s), and exits the cooling system to an environment around the vehicle. However, the working fluid travels in a closed loop, or in multiple closed loops, and is contained within a cooling system 630 of the vehicle 100.

In some examples, the cooling fluid exits the cooling system 630 via a set of sprayers (such as left-side sprayers 172L, 174L, and 176L and right-side sprayers 172R, 174R, and 176R), which spray external surfaces of the vehicle, or portions thereof, for keeping the vehicle surfaces cool. The sprayers may also spray cooling fluid around the vehicle and particularly on tracks of the vehicle, which could otherwise be susceptible to deformation or degradation if allowed to overheat.

In some examples, the closed-loop path or paths that conduct the working fluid (e.g., antifreeze) include one or more coolant pumps for circulating the working fluid around the closed-loop path(s). Also disposed along the path(s) are components to be cooled, such as one or more battery modules, DC/DC converter assemblies, motors, and motor controllers. Such components may be disposed around the loop or loops such that components requiring the greatest cooling are located closest to the outlets of the heat exchangers, where the working fluid is the coldest.

In an example, the disclosed cooling technique uses the fluid (e.g., water or water/foam mixture) supplied via a hose by a fire hydrant or fire truck for fighting fires. Although the majority of the fluid supplied to the vehicle passes through the main conduit/pipe 610 (or multiple such conduits/pipes) to a monitor 150 that may be aimed toward a fire, a small portion of the fluid is diverted to the vehicle itself for cooling.

The cooling system includes an open loop side and a closed loop side. On the open-loop side; starting from the fluid filled conduit/pipe or manifold 610; a valve 802 releases fluid via a port or tap 620 to a liquid-to-liquid heat exchanger 850. The heat exchanger 850 may be mounted inside the chassis 110 or mounted outside the chassis 110, e.g., with working fluid piped to the heat exchanger 850 through a wall of the chassis. As the fluid passes through the heat exchanger 850, the fluid pulls heat from the heat exchanger 850, exits the heat exchanger 850 and travels to the vehicle's external protection system, which includes sprayers covering the top of the vehicle as well as the drive tracks on the side of the vehicle. This provides an endless supply of 'cold' fluid as long as the vehicle 100 is in this environment.

On the closed loop side of the system; starting at the liquid-to-liquid heat exchanger 850, the coolant moves through the battery pack cooler(s) 870, cooling the most vital and sensitive part of the vehicle 100, then to the external ambient air radiator(s) 240. The ambient air radiator fans are disabled while cooling fluid is running through the heat exchanger 850 and are used when the vehicle is operating in normal ambient temperatures, e.g., using a plow or other attachments. From the external radiator(s) 240, the coolant then flows to the DC-to-DC converter cold plates 880, passing through a distribution manifold 882 for the multiple cold plates 880, then rejoining through another distribution manifold 882. The coolant then flows to the coolant reservoir 810 and then to a coolant pump (e.g., 820L or 820R), then to the motor controller cold plate 830L or 830R and motor 840L or 840R, and finally returning to the heat exchanger 850.

Also of note, the coolant runs in a symmetrical path for left/right vehicle systems, joining and diverting at points, e.g., at the coolant reservoir 610. Running with this system is an auxiliary (third) loop that is used, for example, for when the vehicle 100 is charging, bypassing the liquid-to-liquid heat exchangers, motors, motor controllers, and their respective coolant pumps, but circulating through everything else.

Having described certain embodiments, numerous alternative embodiments or variations can be made. For example, although embodiments have been described for use with vehicles having electric drivetrains, embodiments may also be realized with vehicles having other types of drivetrains, such as gasoline or diesel drivetrains.

Also, the order in which components are cooled in the closed-loop paths may be varied in any desirable manner, such that components requiring greater cooling receive colder working fluid than do components requiring lesser cooling. Further, additional or fewer components may be cooled, and components may be cooled that are different from those shown.

In addition, cooling loops may be kept separate rather than being merged at the coolant reservoir 810 or at the DC/DC cold plates 880. For example, separate left coolant and right coolant loops may be provided, which are completely distinct from each another. Separate reservoirs may be provided, one for each loop.

Further, although the disclosed cooling system and method have been described in connection with a particular design of electric firefighting vehicle, embodiments are not limited to that design. For instance, embodiments may be used where the conduit/pipe 610 does not run centrally through the chassis 110 but rather runs along a side, or splits and runs along both sides. The conduit 610 may extend along a top of the chassis, rather than along the bottom. The fluid tap 620 may draw fluid from a manifold or water box, rather than directly from a conduit/pipe 610. Clearly, the disclosed cooling system 630 and method can be used with any of these variations, as well as others, and thus is not limited to any particular vehicle design.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure.

| Table of Reference Numerals | |
| --- | --- |
| Reference Numeral | Description |
| 100 | Robotic firefighting vehicle |
| 110 | Chassis |

Table of Reference Numerals

| Reference Numeral | Description |
| --- | --- |
| 110F | Floor of chassis |
| 122a | Left track |
| 122b | Right track |
| 124 | Drive sprocket, driven by an electric motor via a gearbox |
| 130 | Top deck (e.g., flat, for transporting equipment and/or personnel). |
| 140 | U-shaped or V-shaped mast (e.g., for carrying camera(s), antennas, and/or fluid sprayers). |
| 150 | Monitor (controllable for left-right, up-down pointing), e.g., via remote belly pack |
| 170L/R | Left/Right fluid lines |
| 172L/R | Left/Right side sprayer |
| 174L/R | Left/Right corner sprayer |
| 176L/R | Left/Right top Sprayers |
| 210 | Half coupling for receiving charged fluid (e.g., water, gel, and/or foam), e.g., via hose from fire hydrant, fire truck or other fluid source |
| 240, 240L/R | External radiators, Left/Right external radiators |
| 320 | Front piping to monitor |
| 330 | Flexible insert (provides suspension/cushioning between piping and chassis |
| 610 | Main conduit (e.g., pipe) running from half coupling 210 to front piping 320 along bottom of chassis 110. |
| 620 | Fluid tap from main conduit; supplies fluid to liquid-to-liquid heat exchangers and to sprayers. |
| 630 | Example cooling system |
| 710L, 710R | Left/Right half couplings; e.g., plumbed to left and right heat exchangers 850L and 850R |
| 802 | Valve, for selectively enabling cooling fluid to be drawn off for cooling the vehicle and its components. In some examples, the valve is electronically controllable, such as remotely controllable. |
| 804 | Drawn-off cooling fluid from conduit/pipe 610 |
| 804L/R | Path through Left/Right heat exchanger |
| 810 | Coolant reservoir |
| 820L/R/A | Left/Right/Auxiliary coolant pump |
| 830L/R | Left/Right motor controller cold plate(s) |
| 840, 840L/R | Motors; left and right motors, for turning left and right drive wheels (e.g., sprockets), respectively. |
| 850, 850L/R | Liquid-to-liquid heat exchangers; Left/Right liquid-to-liquid heat exchanger |
| 860 | Check valves |
| 870, 870L/R | Battery pack coolers; Left/Right battery pack cooler |
| 880 | Cold plate(s) for DC/DC converters |
| 882 | Distribution manifold(s) |
| 900 | Method of cooling a firefighting vehicle |
| 910, 920, 930, and 940 | Acts of method 900 |

What is claimed is:

1. A method of providing cooling for a firefighting vehicle, comprising:

directing cooling fluid through a liquid-to-liquid heat exchanger that exchanges heat between the cooling fluid and a working fluid, the cooling fluid drawn from a supply of fluid received by the vehicle for extinguishing fires;

exhausting the cooling fluid through a set of sprayers that cool external portions of the vehicle and/or surroundings of the vehicle; and conveying the working fluid within a closed-loop path that cools a plurality of equipment within the vehicle, wherein the vehicle operates in a first cooling mode based on detecting that the cooling fluid is being directed through the liquid-to-liquid heat exchanger, and wherein the method further comprises, while operating the vehicle in the first cooling mode, detecting that the cooling fluid is not being directed through the liquid-to-liquid heat exchanger and transitioning operation of the vehicle to a second cooling mode based on the detection, wherein operating the vehicle in the second cooling mode includes pumping the working fluid around an additional closed-loop path that at least partially overlaps with the closed-loop path and includes a radiator that exchanges heat between the working fluid and ambient air around the vehicle.

2. The method of claim 1, wherein conveying the working fluid through the closed-loop path includes pumping the working fluid around the closed loop path.

3. The method of claim 2, further comprising arranging the plurality of equipment such that equipment requiring a greater amount of cooling is placed around the closed-loop path closer to an outlet of working fluid from the liquid-to-liquid heat exchanger than equipment requiring a lesser amount of cooling.

4. The method of claim 1, further comprising:

directing additional cooling fluid drawn from the supply of fluid through a second liquid-to-liquid heat exchanger that exchanges heat between the additional cooling fluid and additional working fluid;

exhausting the additional cooling fluid through one of (i) the set of sprayers or (ii) a second set of sprayers that cool external portions of the vehicle and/or surroundings of the vehicle; and conveying the additional working fluid through a second closed-loop path that provides cooling for a second plurality of equipment within the vehicle.

5. The method of claim 4, wherein the plurality of equipment includes a motor controller and motor arranged to propel a first track on a first side of the vehicle, and wherein the second plurality of equipment includes a motor controller and motor arranged to propel a second track on a second side of the vehicle.

6. The method of claim 1, wherein the vehicle is powered at least in part using batteries, and wherein the method further comprises operating the vehicle in the second cooling mode when charging the batteries.

7. The method of claim 1, wherein the radiator has a fan, and wherein the method further comprises:

running the fan when the vehicle is operating in the second cooling mode; and disabling the fan when to the vehicle is operating in the first cooling mode.

8. The method of claim 1, wherein the closed-loop path extends sequentially between different elements of equipment of the plurality of equipment, and wherein the different elements of the plurality of equipment include electrical equipment.

9. The method of claim 8, wherein the working fluid conveyed through the closed-loop path includes antifreeze.

10. A cooling system for a firefighting vehicle, comprising:

a liquid-to-liquid heat exchanger constructed and arranged to exchange heat between a cooling fluid and a working fluid, the cooling fluid drawn from a supply of fluid received by the firefighting vehicle for extinguishing fires;

a set of sprayers coupled to the liquid-to-liquid heat exchanger for spraying the cooling fluid onto external portions of the vehicle and/or surroundings of the vehicle after the cooling fluid has passed through the liquid-to-liquid heat exchanger; and a closed-loop path within which the working fluid is circulated, the closed-loop path including the liquid-to-liquid heat exchanger and a plurality of equipment to be cooled within the vehicle, wherein the vehicle is constructed and arranged to operate in a first cooling mode based on detecting that the cooling fluid is being directed through the liquid-to-liquid heat exchanger and to operate in a second cooling mode based on detecting that the cooling fluid is not being directed through the liquid-to-liquid heat exchanger, wherein operation in the second cooling mode includes an auxiliary pump constructed and arranged to pump the working fluid around an additional closed-loop path that at least partially overlaps with the closed-loop path and includes a radiator constructed and arranged to exchange heat between the working fluid and ambient air around the vehicle.

11. The cooling system of claim 10, further comprising a pump constructed and arranged to circulate the working fluid within the closed-loop path.

12. The cooling system of claim 11, wherein the plurality of equipment is arranged such that equipment requiring a greater amount of cooling is placed around the closed-loop path closer to an outlet of working fluid from the liquid-to-liquid heat exchanger than equipment requiring a lesser amount of cooling.

13. The cooling system of claim 10, further comprising:

a second liquid-to-liquid heat exchanger constructed and arranged to exchange heat between additional cooling fluid and additional working fluid, the additional cooling fluid drawn from the supply of fluid received by the vehicle for extinguishing fires;

a second set of sprayers coupled to the second liquid-to-liquid heat exchanger for spraying the additional cooling fluid onto external portions of the vehicle and/or surroundings of the vehicle after the additional cooling fluid has passed through the second liquid-to-liquid heat exchanger; and a second closed-loop path within which the additional working fluid is circulated, the second closed-loop path including the second liquid-to-liquid heat exchanger and a second plurality of equipment to be cooled within the vehicle.

14. The cooling system of claim 13, wherein the closed-loop path at least partially overlaps with the second closed loop path.

15. The cooling system of claim 13, wherein the plurality of equipment includes a motor controller and motor arranged to propel a first track on a first side of the vehicle, and wherein the second plurality of equipment includes a motor controller and motor arranged to propel a second track on a second side of the vehicle.

16. The cooling system of claim 10, wherein the additional closed-loop path includes a first subset of the plurality of equipment but excludes a second subset of the plurality of equipment.

17. The cooling system of claim 16, further comprising a fan constructed and arranged to blow air through the radiator, wherein the fan is configured to run when the auxiliary pump is running and not to run when the auxiliary pump is not running.

18. The cooling system of claim 17, wherein the vehicle is powered at least in part using batteries, and wherein the auxiliary pump and the fan are configured to run when charging the batteries.

19. A cooling system for a firefighting vehicle, comprising:

a liquid-to-liquid heat exchanger constructed and arranged to exchange heat between a cooling fluid and a working fluid, the cooling fluid drawn from a supply of fluid received by the firefighting vehicle for extinguishing fires;

a set of openings coupled to the liquid-to-liquid heat exchanger for exhausting the cooling fluid outside the vehicle after the cooling fluid has passed through the liquid-to-liquid heat exchanger; and a closed-loop path within which the working fluid is circulated, the closed-loop path including the liquid-to-liquid heat exchanger and a plurality of equipment to be cooled within the vehicle, wherein the vehicle is constructed and arranged to operate in a first cooling mode based on detecting that the cooling fluid is being directed through the liquid-to-liquid heat exchanger and to operate in a second cooling mode based on detecting that the cooling fluid is not being directed through the liquid-to-liquid heat exchanger, wherein operation in the second cooling mode includes an auxiliary pump constructed and arranged to pump the working fluid around an additional closed-loop path that at least partially overlaps with the closed-loop path and includes a radiator constructed and arranged to exchange heat between the working fluid and ambient air around the vehicle.

* * * * *